United States Patent
Ducatel et al.

(10) Patent No.: US 11,347,876 B2
(45) Date of Patent: May 31, 2022

(54) ACCESS CONTROL (71) Applicant: British Telecommunications Public Limited Company, London (GB)

(72) Inventors: Gery Ducatel, London (GB); Theo Dimitrakos, London (GB); Joshua Daniel, London (GB)

(73) Assignee: British Telecommunications Public Limited Company, London (GB)

(*) Notice: Subject to any disclaimer, the term of this patent is extended or adjusted under 35 U.S.C. 154(b) by 204 days.

(21) Appl. No.: 15/749,289

(22) PCT Filed: Jul. 20, 2016

(86) PCT No.: PCT/EP2016/067309
§ 371 (c)(1),
(2) Date: Jan. 31, 2018

(87) PCT Pub. No.: WO2017/021154
PCT Pub. Date: Feb. 9, 2017

(65) Prior Publication Data
US 2018/0225466 A1    Aug. 9, 2018

(30) Foreign Application Priority Data

Jul. 31, 2015 (EP) .................... 15179442

(51) Int. Cl.
*H04L 29/00* (2006.01)
*G06F 21/62* (2013.01)
(Continued)

(52) U.S. Cl.
CPC .............. *G06F 21/62* (2013.01); *G06F 21/10* (2013.01); *G06Q 20/065* (2013.01);
(Continued)

(58) Field of Classification Search
CPC ........ G06F 21/62; G06F 21/10; G06Q 20/065; H04L 9/0637
(Continued)

(56) References Cited

U.S. PATENT DOCUMENTS 6,192,405 B1   2/2001   Bunnell
7,716,739 B1   5/2010   McCorkendale
(Continued)

FOREIGN PATENT DOCUMENTS

EP    2381363 A2   10/2011
EP    2101599 B1    9/2013
(Continued)

OTHER PUBLICATIONS

International Search Report for corresponding International Application No. PCT/EP2016/067309 dated Nov. 3, 2016; 4 pages.
(Continued)

*Primary Examiner* — Jeffrey C Pwu
*Assistant Examiner* — Michael D Anderson
(74) *Attorney, Agent, or Firm* — Patterson Thuente IP (57) ABSTRACT

A computer implemented method of access control for a restricted resource of a resource provider in a network connected computer system, wherein a blockchain data structure accessible via the network stores digitally signed records validated by network connected miner software components, the method including: identifying an access control role definition for access to the resource, the role including a specification of access permissions; defining a cryptocurrency for indicating authorization to access the resource, the cryptocurrency being formed of tradeable units of value associated with records in the blockchain and wherein transfer of the cryptocurrency between records in the blockchain is validated by the miners; receiving a request from an authenticated resource consumer for autho-
(Continued)

rization to access the resource; and submitting a blockchain transaction to the miner components to transfer a quantity of cryptocurrency to a consumer record in the blockchain, the transaction including an identification of the role, such that the consumer record identifies that the consumer is authorized to access the resource in accordance with the role definition.

6 Claims, 3 Drawing Sheets

(51) Int. Cl.
    *G06F 21/10*     (2013.01)
    *G06Q 20/06*     (2012.01)
    *H04L 9/06*     (2006.01)
    *H04L 9/32*     (2006.01)
    *H04L 9/40*     (2022.01)
(52) U.S. Cl.
    CPC .......... *H04L 9/0637* (2013.01); *H04L 9/3247* (2013.01); *H04L 63/10* (2013.01); *H04L 63/12* (2013.01); *H04L 2209/16* (2013.01)
(58) Field of Classification Search
    USPC .......................................................... 726/27
    See application file for complete search history.

(56) References Cited

U.S. PATENT DOCUMENTS

| | | | |
|---|---|---|---|
| 7,797,748 B2 | 9/2010 | Zheng et al. | |
| 7,870,153 B2 | 1/2011 | Croft et al. | |
| 8,271,974 B2 | 9/2012 | Mazhar et al. | |
| 8,375,437 B2 | 2/2013 | Linsley et al. | |
| 8,479,294 B1 | 7/2013 | Li et al. | |
| 8,516,241 B2 | 8/2013 | Chang et al. | |
| 8,739,155 B2 | 5/2014 | Hehir et al. | |
| 9,009,825 B1 | 4/2015 | Chang et al. | |
| 9,183,378 B2 | 11/2015 | Banerjee et al. | |
| 9,235,813 B1 | 1/2016 | Qian et al. | |
| 9,466,051 B1 | 10/2016 | Roth et al. | |
| 9,495,668 B1 | 11/2016 | Juels et al. | |
| 9,807,106 B2 | 10/2017 | Daniel et al. | |
| 10,680,915 B2 | 6/2020 | O'Brien | |
| 2002/0100035 A1 | 7/2002 | Kenyon et al. | |
| 2002/0120725 A1 | 8/2002 | Dacosta et al. | |
| 2003/0084349 A1 | 5/2003 | Friedrichs et al. | |
| 2003/0204644 A1 | 10/2003 | Vincent | |
| 2004/0015977 A1 | 1/2004 | Benke et al. | |
| 2004/0268296 A1 | 12/2004 | Kayam et al. | |
| 2005/0091269 A1 | 4/2005 | Gerber et al. | |
| 2006/0282660 A1 | 12/2006 | Varghese et al. | |
| 2009/0254499 A1 | 10/2009 | Deyo | |
| 2010/0011029 A1 | 1/2010 | Niemelae | |
| 2010/0262873 A1 | 10/2010 | Chang et al. | |
| 2011/0197070 A1 | 8/2011 | Mizrah | |
| 2011/0265154 A1 | 10/2011 | Furlan et al. | |
| 2012/0044862 A1 | 2/2012 | Chen et al. | |
| 2012/0053925 A1 | 3/2012 | Geffin et al. | |
| 2012/0215727 A1 | 8/2012 | Malik et al. | |
| 2012/0246290 A1 | 9/2012 | Kagan | |
| 2012/0284794 A1 | 11/2012 | Trent et al. | |
| 2012/0304007 A1 | 11/2012 | Hanks et al. | |
| 2012/0311526 A1 | 12/2012 | Deanna et al. | |
| 2013/0006949 A1 | 1/2013 | Essawi et al. | |
| 2014/0067734 A1 | 3/2014 | Hawkins et al. | |
| 2014/0164251 A1 | 6/2014 | Loh | |
| 2014/0180738 A1 | 6/2014 | Phillipps et al. | |
| 2014/0215490 A1 | 7/2014 | Mathur et al. | |
| 2014/0298011 A1 | 10/2014 | Ganesan | |
| 2014/0344015 A1* | 11/2014 | Puertolas-Montanes | ............ G06Q 20/10 705/7.29 |
| 2014/0358825 A1 | 12/2014 | Phillipps et al. | |
| 2014/0372346 A1 | 12/2014 | Phillipps et al. | |
| 2015/0120567 A1* | 4/2015 | Van Rooyen | ...... G06Q 20/3829 705/59 |
| 2015/0134606 A1 | 5/2015 | Magdon-Ismail et al. | |
| 2015/0170112 A1* | 6/2015 | DeCastro | ............ G06Q 20/381 705/39 |
| 2015/0206106 A1* | 7/2015 | Yago | .................. G06Q 20/0655 705/68 |
| 2015/0227741 A1 | 8/2015 | Permeh et al. | |
| 2015/0271318 A1 | 9/2015 | Antos et al. | |
| 2015/0332283 A1 | 11/2015 | Witchey | |
| 2015/0332395 A1 | 11/2015 | Walker et al. | |
| 2015/0356523 A1 | 12/2015 | Madden | |
| 2015/0356555 A1 | 12/2015 | Pennanen et al. | |
| 2015/0363876 A1 | 12/2015 | Ronca et al. | |
| 2015/0379423 A1 | 12/2015 | Dirac et al. | |
| 2016/0048771 A1 | 2/2016 | Chen et al. | |
| 2016/0057041 A1 | 2/2016 | Gupta et al. | |
| 2016/0078367 A1 | 3/2016 | Adjaoute | |
| 2016/0086175 A1 | 3/2016 | Finlow-Bates et al. | |
| 2016/0098730 A1 | 4/2016 | Feeney | |
| 2016/0112240 A1 | 4/2016 | Sundaresan | |
| 2016/0164884 A1 | 6/2016 | Sriram et al. | |
| 2016/0221186 A1 | 8/2016 | Perrone | |
| 2016/0260095 A1 | 9/2016 | Ford | |
| 2016/0261690 A1 | 9/2016 | Ford | |
| 2016/0283920 A1 | 9/2016 | Fisher et al. | |
| 2016/0350173 A1 | 12/2016 | Ahad | |
| 2016/0364787 A1 | 12/2016 | Walker et al. | |
| 2017/0063886 A1 | 3/2017 | Muddu et al. | |
| 2017/0109735 A1 | 4/2017 | Sheng et al. | |
| 2017/0124534 A1 | 5/2017 | Savolainen et al. | |
| 2017/0279774 A1 | 9/2017 | Booz et al. | |
| 2017/0279818 A1 | 9/2017 | Milazzo et al. | |
| 2017/0286136 A1 | 10/2017 | Dimitrakos et al. | |
| 2018/0025166 A1 | 1/2018 | Daniel | |
| 2018/0144114 A1 | 5/2018 | Fiske et al. | |
| 2018/0225469 A1 | 8/2018 | Daniel et al. | |
| 2018/0225611 A1 | 8/2018 | Daniel et al. | |
| 2018/0232526 A1 | 8/2018 | Reid et al. | |
| 2018/0285585 A1 | 10/2018 | Daniel et al. | |
| 2018/0336552 A1 | 11/2018 | Bohli | |
| 2019/0036895 A1 | 1/2019 | Irvine | |
| 2019/0050541 A1 | 2/2019 | Wright et al. | |
| 2019/0139136 A1 | 5/2019 | Molinari et al. | |
| 2019/0354968 A1 | 11/2019 | Sato | |
| 2020/0073466 A1 | 3/2020 | Walsh | |
| 2020/0177373 A1 | 6/2020 | Komandur | |
| 2020/0183757 A1 | 6/2020 | Liu | |

FOREIGN PATENT DOCUMENTS

| | | |
|---|---|---|
| EP | 2816469 A1 | 12/2014 |
| EP | 3101599 A2 | 12/2016 |
| GB | 2540976 | 2/2017 |
| GB | 2540976 A | 2/2017 |
| GB | 2540977 | 2/2017 |
| GB | 2540977 A | 2/2017 |
| WO | WO-0184285 A2 | 11/2001 |
| WO | WO-2012117253 A1 | 9/2012 |
| WO | WO-2013172750 A1 | 11/2013 |
| WO | WO-2015128612 A1 | 9/2015 |
| WO | WO-2015179020 A2 | 11/2015 |
| WO | WO-2016034496 A1 | 3/2016 |
| WO | WO-2016077127 A1 | 5/2016 |
| WO | WO-2016191639 A1 | 12/2016 |
| WO | WO-2017021153 A1 | 2/2017 |
| WO | WO-2017021155 A1 | 2/2017 |
| WO | WO-2017054985 A1 | 4/2017 |
| WO | WO-2017167547 A1 | 10/2017 |
| WO | WO-2017167548 A1 | 10/2017 |
| WO | WO-2017167549 A1 | 10/2017 |
| WO | WO-2017167550 A1 | 10/2017 |
| WO | WO-2018178026 | 10/2018 |
| WO | WO-2018178034 | 10/2018 |
| WO | WO-2018178035 | 10/2018 |
| WO | WO-2018206374 | 11/2018 |
| WO | WO-2018206405 | 11/2018 |

(56) References Cited

FOREIGN PATENT DOCUMENTS

| WO | WO-2018206406 | 11/2018 |
| --- | --- | --- |
| WO | WO-2018206407 | 11/2018 |
| WO | WO-2018206408 | 11/2018 |
| WO | WO2018228950 | 12/2018 |
| WO | WO2018228951 | 12/2018 |
| WO | WO2018228952 | 12/2018 |
| WO | WO2018228973 | 12/2018 |
| WO | WO2018228974 | 12/2018 |

OTHER PUBLICATIONS

Written Opinion of the International Searching Authority for corresponding International Application No. PCT/EP2016/067309 dated Nov. 3, 2016; 5 pages.
Jason Paul Cruz et al: "The Bitcoin Network as Platform for TransOrganizational Attribute Authentication", WEB 2015—The Third International Conference on Building and Exploring Web Based Environments, May 24, 2015 (May 24, 2015), XP055239598, Rome, Italy; 9 pages.
Anonymous: "Can BitCoin be a better DRM? BitcoinBeginners", Feb. 17, 2014 (Feb. 17, 2014), XP055239400, retrieved from: https://www.reddit.com/r/BitcoinBeginners/comments/1y5yh8/can_bitcoin_be_a_better_drm, 3 pages.
Anonymous: "Colored Coins—Bitcoin Wiki", Jul. 7, 2015 (Jul. 7, 2015), XP055239396, Retrieved from: https://en.bitcoin.it/w/index.php?title_Colored_Coins&oldid_57259 ; 6 pages.
Andreas M. Antonopoulos; Mastering Bitcoin. Unlocking Digital Crypto-Currencies. Early Release Raw & Unedited; Dec. 2014 First Edition; ISBN: 978-1-449-37404-4; retrieved from: https://unglueit-files.s3.amazonaws.com/ebf/05db7df4f31840f0a873d6eal4dcc28d.pdf (O'Reilly Media, Apr. 2014); 282 pages.
Dr. Gavin Wood; "Ethereum: A Secure Decentralised Generalised Transaction Ledger" EIP-150 Revision; (2014); 32 pages.
Meni Rosenfeld "Overview of Colored Coins" (Dec. 4, 2012) https://bravenewcoin.com/assets/Whitepapers/Overview-of-Colored-Coins.pdf 13 pages.
Assia, Y. et al, "Colored Coins Whitepaper" (2015), retrieved from docs.google.com/document/d/1AnkP_cVZTCMLIzw4DvsW6M8Q2JC01IzrTLuoWu2z1BE ), 23 pages.
Andreas M. Antonopoulos, "Mastering Bitcoin. Unlocking Digital Crypto-Currencies." O'Reilly Media, Apr. 2014, 282 pages.
Roger Piqueras Jover et al., "dHSS—distributed Peer-to-Peer implementation of the LTE HSS based on the bitcoin/namecoin architecture," 2016 IEEE International Conference on Communications Workshops (ICC), IEEE, May 23, 2016, pp. 354-359, XP032919891, DOI: 10.1109/ICCW.2016.7503813.
Tomoyuki Sanda et al., "Proposal of new authentication method in Wi-Fi access using Bitcoin 2.0," 2016 IEEE 5$^{th}$ Global Conference on Consumer Electronics, IEEE, Oct. 11, 2016, pp. 1-5, XP033032268, DOI: 10.1109/GTCCE.2016.78000479.
Deloitte, "Blockchain @ Telco How blockchain can impact the telecommunications industry and its relevance to the C-Suite Introduction to blockchain," Nov. 28, 2016, XP0555394340, Retrieved from the Internet: URL: https://www2.deloitte.com/content/dam/Deloitte/za/Documents/technology-media-telecommunications/za_TMT_Blockchain_TelCo.pdf [retrieved Jul. 27, 2017] p. 9-p. 20.
Combined Search and Examination Report for Great Britain Application No. 1707377.6, dated Nov. 9, 2017, 9 pages.
Combined Search and Examination Report for Great Britain Application No. 1707379.2, dated Nov. 9, 2017, 9 pages.
International Preliminary Report for Application No. PCT/EP2018/061261, dated Nov. 21, 2019, 8 pages.
International Search Report and Written Opinion for Application No. PCT/EP2018/061405, dated Jun. 20, 2018, 12 pages.
International Search Report and Written Opinion for Application No. PCT/EP2018/061406, dated Jun. 20, 2018, 13 pages.
"A Next-Generation Smart Contract and Decentralized Application Platform" Ethereum White Paper, 2016, retrieved from https://github.com/ethereum/wiki/wiki/White-Paper on Nov. 13, 2018, 40 pages.
Adler M., "Threat Intelligence Visibility—the way forward," BT, 2015, available from www.globalservices.bt.com/uk/en/products/assure threat_ monitoring, 8 pages.
Ahmad S., et al., "How Do Neurons Operate on Sparse Distributed Representations? A Mathematical Theory of Sparsity, Neurons and Active Dendrites," available from Cornell University Library (citation arXiv: 1601.00720) and https://arxiv.org/ftp/arxiv/papers/1601/1601.00720.pdf, retrieved on Mar. 28, 2018, 23 pages.
Ahmad S., et al., "Properties of Sparse Distributed Representations and their Application to Hierarchical Temporal Memory," available from Cornell University Library (citation arXiv: 1503.07469) and https://arx.iv.org/ftp/arx.iv/papers/1503/1503.07469.pdf, retrieved on Mar. 28, 2018, Numenta, Redwood City, CA, USA, Mar. 24, 2015, 18 pages.
Ahmad S., et al., "Real-Time Anomaly Detection for Streaming Analytics," available from Cornell University Library (citation arXiv: 1607.02480) and https://arxiv.org/pdf/1607.02480.pdf, retrieved on Mar. 28, 2018, Numenta, Inc., Redwood City, CA, USA, Jul. 8, 2016, 10 pages.
Anonymous, "Who Will Protect Users From Ethereum Based Malware? : Ethereum," Mar. 28, 2016, Retrieved from https://www.reddit.com/r/ethereum/comments/4ccfaa/who_will_protect_users_from_ethereum_based_malware/?st=itbp2q49&sh=d8cc4355 on Nov. 13, 2018, 3 pages.
Application as filed for U.S. Appl. No. 16/086,087, filed Sep. 18, 2018, 148 pages, Inventor(s): Smith et al.
Application as filed for U.S. Appl. No. 16/086,109, filed Sep. 18, 2018, 263 pages, Inventor(s): Daniel et al.
Asmi E.A.K., et al., "Bitcoin-Based Decentralized Carbon Emissions Trading Infrastructure Model," Systems Engineering, Mar. 2015, vol. 18 (2), Retrieved from the Internet: URL: https://www.researchgate.net/publication/268686553, 15 pages.
Bakshi, et al., "Securing Cloud from DDOS Attacks Using Intrusion Detection System in Virtual Machine," IEEE, 2010, 5 pages.
Bellifemine, et al., "JADE: A Software Framework for Developing Multi-Agent Applications. Lessons Learned," Elsevier, 2007, 12 pages.
Benders J.F., "Partitioning Procedures for Solving Mixed Variables Programming Problems," 1962, vol. 4, pp. 238-252.
Billaudelle S., et al., "Porting HTM Models to the Heidelberg Neuromorphic Computing Platform," available from Cornell University Library (citation arXiv: 1505. 02142), retrieved on Mar. 28, 2018, from https://arx.iv.org/pdf/1505.02142.pdf, Kirchhoff-Institute for Physics, May 2015, 9 pages.
Biryukov A., et al., "R&D in Smart Contracts, Cryptocurrency and Blockchain," University of Luxembourg, Jan. 19, 2016, XP055306767, Retrieved from http://wwwfr.uni.lu/snt/news_events/speaker_s_presentations on Sep. 29, 2016, pp. 51 pages.
Bitcoin Developer Guide, "Transactions," Retrieved from https://github.com/bitcoin-dot-org.bitcoin.org.bitcoin.org/blob/64e4c549bc5fae480e2f400c052686fd34c8fae/_includes/devdoc/guide_transactions.md, 2017, 10 pages.
Bonneau J., et al., "Research Perspectives and Challenges for Bitcoin and Cryptocurrencies," International Association for Cryptologic Research, Mar. 19, 2015, 18 pages.
Chaisiri, "Optimization of Resource Provisioning Cost in Cloud Computing," IEEE Transactions on Services Computing, Apr.-Jun. 2012, vol. 5 (2), 14 pages.
Combined search and Examination Report under Sections 17 and 18(3) for Great Britain Application No. 1707376.8, dated Nov. 9, 2017, 8 pages.
Combined search and Examination Report under Sections 17 and 18(3) for Great Britain Application No. 1707378.4, dated Nov. 9, 2017, 11 pages.
Cui, et al., "Continuous Online Sequence Learning with an Unsupervised Neural Network Model," Published in Neural Computation and available from https://www.mitpressjournals.org/doi/pdf/10.1162/NECOa_00893, retrieved on Mar. 28, 2018, Numenta Inc., Redwood City, CA, USA, Nov. 2016, vol. 28 (11), 31 pages.
Cui, et al., "The HTM Spatial Pooler: A Neocortical Algorithm for Online Sparse Distributed Coding," available from Cold Spring Harbor Laboratory bioRxiv (citation doi.org/10.1101/085035) and https://www.biorxiv.org/content/biorxiv/early/2017/02/16/085035.

(56) References Cited

OTHER PUBLICATIONS full.pdf, retrieved on Mar. 28, 2018, Numenta Inc., Redwood City, CA, USA, Feb. 3, 2017, 16 pages.
Czepluch J.S., et al., "The Use of Block Chain Technology in Different Application Domains," XP055242451, retrieved from http://http://www.lollike.org/bachelor.pdf, May 20, 2015, 109 pages.
European Search Report for Application No. EP17164006.3, dated Jun. 29, 2017, 6 pages.
Extended European Search Report for Application No. 17170020.6, dated Nov. 10, 2017, 8 pages.
Extended European Search Report for Application No. 17170022.2, dated Nov. 16, 2017, 8 pages.
Extended European Search Report for Application No. 17170024.8, dated Nov. 10, 2017, 10 pages.
Extended European Search Report for Application No. EP15179440.1, dated Feb. 10, 2016, 6 pages.
Fischer A., et al., "An Introduction to Restricted Boltzmann Machines," in: Progress in Pattern Recognition, Image Analysis, Computer Vision and Applications, vol. 7441 of the series Lecture Notes in Computer Science, 2012, pp. 14-36.
Grushack J., et al., "Currency 3.0, Examining Digital Crypto Currency Markets," Union College, XP055242356, Retrieved from http://antipasto.union.edu/engineering/Archives/SeniorProjects/2014/CS.2014/files/grushacj/grushacj_paper.pdf, Jun. 2014, 44 pages.
Hawkins, et al., "Why Neurons Have Thousands of Synapses, A Theory of Sequence Memory in Neocortex," Published in Frontiers in Neural Circuits (10 (2016) 1-13, doi:l0.3389/fncir.2016.00023) and available from https://www.frontiersin.org/articlesll0.3389/fncir.2016.00023/full, retrieved on Mar. 28, 2018, Numenta Inc., Redwood City, CA, USA, Mar. 30, 2016, 13 pages.
Hawkins, et al., in "On Intelligence, How a New Understanding of the Brain Will Lead to the Creation of Truly Intelligent Machines," 2004, Times Books, ISBN 0-8050-7 456-2, Jul. 14, 2005, 174 pages.
International Preliminary Report on Patentability for Application No. PCT/EP2015/069670, dated Mar. 16, 2017, 7 pages.
International Preliminary Report on Patentability for Application No. PCT/EP2015/069673, dated Mar. 16, 2017, 9 pages.
International Preliminary Report on Patentability for Application No. PCT/EP2016/052865, dated Aug. 24, 2017, 9 pages.
International Preliminary Report on Patentability for Application No. PCT/EP2016/067308, dated Feb. 15, 2018, 7 pages.
International Preliminary Report on Patentability for Application No. PCT/EP2016/067310, dated Feb. 15, 2018, 8 pages.
International Preliminary Report on Patentability for Application No. PCT/EP2017/055081, dated Oct. 11, 2018, 9 pages.
International Preliminary Report on Patentability for Application No. PCT/EP2017/055082, dated Oct. 11, 2018, 8 pages.
International Preliminary Report on Patentability for Application No. PCT/EP2017/055090, dated Oct. 11, 2018, 10 pages.
International Preliminary Report on Patentability for Application No. PCT/EP2017/055091, dated Oct. 11, 2018, 9 pages.
International Preliminary Report on Patentability for Application No. PCT/EP2018/057674, dated Oct. 10, 2019, 8 pages.
International Preliminary Report on Patentability for Application No. PCT/EP2018/057685, dated Oct. 10, 2019, 9 pages.
International Preliminary Report on Patentability for Application No. PCT/EP2018/057686, dated Oct. 10, 2019, 8 pages.
International Preliminary Report on Patentability for Application No. PCT/EP2018/061405, dated Nov. 21, 2019, 7 pages.
International Preliminary Report on Patentability for Application No. PCT/EP2018/061406, dated Nov. 21, 2019, 8 pages.
International Preliminary Report on Patentability for Application No. PCT/EP2018/061407, dated Nov. 21, 2019, 8 pages.
International Preliminary Report on Patentability for Application No. PCT/EP2018/061408, dated Nov. 21, 2019, 10 pages.
International Preliminary Report on Patentability forApplication No. PCT/EP2017/055094, dated Oct. 11, 2018, 8 pages.
International Search Report and Written Opinion forApplication No. PCT/EP2015/069670, dated Nov. 11, 2015, 8 pages.
International Search Report and Written Opinion forApplication No. PCT/EP2015/069673, dated Nov. 12, 2015, 10 pages.
International Search Report and Written Opinion forApplication No. PCT/EP2016/052865, dated Mar. 17, 2016, 11 pages.
International Search Report and Written Opinion forApplication No. PCT/EP2016/067310, dated Sep. 22, 2016, 9 pages.
International Search Report and Written Opinion forApplication No. PCT/EP2017/055081, dated Apr. 7, 2017, 11 pages.
International Search Report and Written Opinion forApplication No. PCT/EP2017/055082, dated Apr. 26, 2017, 9 pages.
International Search Report and Written Opinion forApplication No. PCT/EP2017/055090, dated Jun. 14, 2017, 12 pages.
International Search Report and Written Opinion for Application No. PCT/EP2017/055091, dated Apr. 11, 2017, 11 pages.
International Search Report and Written Opinion for Application No. PCT/EP2017/055094, dated May 15, 2017, 10 pages.
International Search Report and Written Opinion for Application No. PCT/EP2017/055095, dated Apr. 11, 2017, 10 pages.
International Search Report and Written Opinion for Application No. PCT/EP2018/057674, dated May 2, 2018, 10 pages.
International Search Report and Written Opinion for Application No. PCT/EP2018/057685, dated Jun. 1, 2018, 9 pages.
International Search Report and Written Opinion for Application No. PCT/EP2018/057686, dated Apr. 20, 2018, 10 pages.
International Search Report and Written Opinion for Application No. PCT/EP2018/061261, dated Jun. 20, 2018, 13 pages.
International Search Report and Written Opinion for Application No. PCT/EP2018/061407, dated Jun. 20, 2018, 13 pages.
International Search Report and Written Opinion for Application No. PCT/EP2018/061408, dated Jun. 20, 2018, 15 pages.
International Search Report and Written Opinion for PCT Application No. PCT/EP2016/067308, dated Sep. 21, 2016, 8 pages.
International Preliminary Report on Patentability for Application No. PCT/EP2017/055095, dated Oct. 11, 2018, 8 pages.
Jin, et al., "A Guest-Transparent File Integrity Monitoring Method in Virtualization Environment," Elsevier, 2010, 11 pages.
Lavin, et al., "Evaluating Real-time Anomaly Detection Algorithms, the Numenta Anomaly Benchmark," available from Cornell University Library (citation archive:1510.03336) https://arxiv.org/ftp/arxiv/papers/1510/1510.03336.pdf, retrieved on Mar. 28, 2018, Numenta, Inc., Redwood City, CA, USA, Oct. 9, 2015, 8 pages.
Miller A., "The State-of-the-Art of Smart Contracts," FinTech R&D Innovation Conference, Luxemburg, Jan. 19, 2016, Retrieved from URL: http://wwwfr.uni.lu/snt/news_events/speaker_s_presentations on Sep. 29, 2016, 29 pages.
Numenta, "Biological and Machine Intelligence (BAMI), A living book that documents Hierarchical Temporal Memory (HTM)," Numenta, Inc., Mar. 8, 2017, retrieved on Mar. 28, 2018 from https://numenta.com/assets/pdf/biological-and-machine-intelligence/BAMIComplete.pdf, 69 pages.
Numenta, "Hierarchical Temporal Memory including HTM Cortical Learning Algorithms," Version 0.2.1, Numenta, Sep. 12, 2011, 68 pages.
Numenta, "Sparse Distributed Representations," (Numenta, available from https://numenta.com/assets/pdf/biological-and-machine-intelligence/BaMISDR.pdf and accessed on Mar. 29, 2017, retrieved on Mar. 28, 2018, 15 pages.
Olshausen, et al., "Sparse Coding with an Overcomplete Basis Set, A Strategy Employed by VI?," Olshausen, B.A., Field, D.J., 1997, Vision Research, 37:3311-3325) retrieved on Mar. 28, 2018 from http://www.chaos.gwdg.de/michael/CNScourse_2004/papersmax/OlshausenFieldl997.pdf, Dec. 24, 1996, 15 pages.
Patel H, "A block chain based decentralized exchange," International Association for Cryptologic Research, XP061017563, Dec. 18, 2014, vol. 20141225:065012, 9 pages.
Plohmann D., et al., "Case study of the Miner Botnet," 4th International Conference on Cyber Conflict, Jun. 5, 2012, pp. 345-360.
Purdy S., "Encoding Data for HTM Systems," Available from Cornell University Library (citation arXiv: 1602.05925), retrieved on Mar. 28, 2018 from https://arx.iv.org/ftp/arx.iv/papers/1602/1602.05925.pdf, Numenta, Inc., Redwood City, California, USA, Feb. 2016, 11 pages.

(56) References Cited

OTHER PUBLICATIONS

Search Report dated Nov. 8, 2017 for Great Britain Application No. GB1707381.8, 7 pages.
Shah S.Y., et al., "Price Based Routing for Event Driven Prioritized Traffic in Wireless Sensor Networks," Apr. 29-May 1, 2013, IEEE 2nd Network Science Workshop, XP032487185, 8 pages.
Sood A.K., et al., "An Empirical Study of HTTP-based Financial Botnets," IEEE Transactions on Dependable and Secure Computing, IEEE Service Center, New York, NY, US, vol. 13 (2), Mar. 2016, pp. 236-251.
Tschorsch F., et al., "Bitcoin and Beyond: A Technical Survey on Decentralized Digital Currencies," International Association for Cryptologic Research, May 15, 2015, pp. 1-37.
Wang Z., "The Applications of Deep Learning on Traffic Identification," 2012, Advances in Neural Information Processing Systems, 2015, 10 pages.
Wikipedia, "Blockchain (database)—Wikipedia," Nov. 29, 2015, retrieved from https://en.wikipedia.org/w/index.php?title=Block_chain_(database)&oldid=692921608 on Nov. 13, 2018, pp. 1-5.
Wu J., et al., "Hierarchical Temporal Memory Method for Time-Series-Based Anomaly Detection," 2016, IEEE, 16th International Conference Data Mining Workshops, XP033055893, Dec. 12, 2016, pp. 1167-1172.
Zambonelli, et al., "Agent-Oriented Software Engineering for Internet Applications," Coordination of Internet Agents: Models, Technologies, and Applications, Chapter—13, Springer, 2000, 21 pages.
Zupan B., et al., "Machine Learning by Function Decomposition," ICML 1997, Retrieved from https://citeseerx.ist.psu.edu/viewdoc/download?doi=10.1.1.29.4455&rep=rep1&type=pdf on Oct. 17, 2017, 9 pages.
U.S. Appl. No. 15/749,338, filed Jan. 31, 2018, Inventor(s): Daniel et al.
U.S. Appl. No. 15/749,391, filed Jan. 31, 2018, Inventor(s): Daniel et al.
Application and Filing Receipt for U.S. Appl. No. 15/223,261, filed Jul. 29, 2016, Inventor(s): Daniel et al.
Application and Filing Receipt for U.S. Appl. No. 15/548,654, filed Aug. 3, 2017, Inventor(s): Daniel et al.
Application and Filing Receipt for U.S. Appl. No. 15/939,650, filed Mar. 29, 2018, Inventor(s): Daniel et al.
Application and Filing Receipt for U.S. Appl. No. 16/086,058, filed Sep. 18, 2018, Inventor(s): Daniel et al.
Application and Filing Receipt for U.S. Appl. No. 16/086,074, filed Sep. 18, 2018, Inventor(s): Daniel et al.
Application and Filing Receipt for U.S. Appl. No. 16/086,087, filed Sep. 18, 2018, Inventor(s): Smith et al.
Application and Filing Receipt for U.S. Appl. No. 16/086,109, filed Sep. 18, 2018, Inventor(s): Daniel et al.
Application and Filing Receipt for U.S. Appl. No. 16/498,827, filed Sep. 27, 2019, Inventor(s): Daniel et al.
Application and Filing Receipt for U.S. Appl. No. 16/498,880, filed Sep. 27, 2019, Inventor(s): Daniel et al.
Application and Filing Receipt for U.S. Appl. No. 16/498,932, filed Sep. 27, 2019, Inventor(s): Daniel et al.
Application and Filing Receipt for U.S. Appl. No. 16/611,682, filed Nov. 7, 2019, Inventor(s): Ghanea-Hercock.
Application and Filing Receipt for U.S. Appl. No. 16/611,686, filed Nov. 7, 2019, Inventor(s): Ghanea-Hercock.
Application and Filing Receipt for U.S. Appl. No. 16/611,694, filed Nov. 7, 2019, Inventor(s): Ghanea-Hercock.
Application and Filing Receipt for U.S. Appl. No. 16/611,701, filed Nov. 7, 2019, Inventor(s): Ghanea-Hercock.
Application and Filing Receipt for U.S. Appl. No. 16/611,707, filed Nov. 7, 2019, Inventor(s): Ghanea-Hercock.
Communication pursuant to Article 94(3) EPC for Application No. 16742260.9, dated May 4, 2021, 6 pages.
International Preliminary Report on Patentability for Application No. PCT/EP2016/067309, dated Feb. 15, 2018, 7 pages.

\* cited by examiner

ACCESS CONTROL

CROSS-REFERENCE TO RELATED APPLICATIONS

The present application is a National Phase entry of PCT Application No. PCT/EP2016/067309, filed on Jul. 20, 2016, which claims priority to EP Patent Application No. 15179442.7, filed on Jul. 31, 2015, which are hereby fully incorporated herein by reference.

TECHNICAL FIELD

The present invention relates to access control. In particular it relates to access control using a blockchain data structure.

BACKGROUND

Computing resources such as hardware, software or combination resources are increasingly deployed in a distributed manner. Resources can include, for example: security services such as antimalware, proxy, antivirus, scanning or protective services; data storage services such as real or virtualized memories, data stores or databases; middleware services such as messaging middleware software, transaction handling software and the like; business process automation such as commercial applications, bespoke business process software and the like; network services such as telecommunications, communication facilities, internet servers or websites; directory services such as registries; media services such as audio, video or multimedia; network access facilities; entertainment services such as computer entertainment software, video games and the like; social media services; and other resources or services as will be apparent to those skilled in the art. Distributed computing environments are environments in which computer systems, services and supporting or offered resources (whether hardware, software or a combination) are distributed physically and/or virtually with a dependence on communications networks for interoperability. Furthermore, consumers of such resources are increasingly detached from the providers of the resources such that there may be no pre-existing relationship, knowledge or trust between consumers and providers.

Access control for computing resources is a requirement where resources are restricted. Such restrictions can be imposed, for example, to manage load or contention for resources, to ensure approval to access resources, or to secure sensitive or limited resources. Access control therefore varies by consumer such that different consumers can have different access control permissions for a particular resource. Managing access control permissions for all possible consumers is a considerable challenge for resource providers that causes considerable overhead.

To alleviate these challenges role-based access control systems can be employed by resource providers. Role-based access control is technique for regulating access to resources based on defined consumer roles. A role is a definition of a class of access for one or more users and can include a definition of access permissions, resources and the like. Accordingly, role-based access control simplifies access control management for resource providers by requiring only consumer role associations and role definitions. However, the distributed nature of computer systems and computing resources means that computing solutions are increasingly no longer under common or centralized control or administration. For example, cloud computing services can be comprised of multiple computing resources distributed across potentially many physical and/or virtualized computer systems anywhere in the world with each such system being administered separately or in groups/associations. Access control mechanisms in this context require sharing and synchronizing access control data such as user roles and role definitions across all resource providers in all systems. Efficiently maintaining such shared access control information in a manner that reduces inconsistencies or synchronization delays imposes a considerable burden for computer systems and the network.

SUMMARY

Accordingly it would be beneficial to provide access control mechanisms that mitigate these challenges.

The present disclosure accordingly provides, in a first aspect, a computer implemented method of access control for a restricted resource of a resource provider in a network connected computer system, wherein a blockchain data structure accessible via the network stores digitally signed records validated by network connected miner software components, the method comprising: identifying an access control role definition for access to the resource, the role including a specification of access permissions; defining a cryptocurrency for indicating authorization to access the resource, the cryptocurrency being formed of tradeable units of value associated with records in the blockchain and wherein transfer of the cryptocurrency between records in the blockchain is validated by the miners; receiving a request from an authenticated resource consumer for authorization to access the resource; and submitting a blockchain transaction to the miner components to transfer a quantity of cryptocurrency to a consumer record in the blockchain, the transaction including an identification of the role, such that the consumer record identifies that the consumer is authorized to access the resource in accordance with the role definition.

In some embodiments the identification of the role in the consumer record is obfuscated such that it is not discernible without a shared secret.

In some embodiments the cryptocurrency is a pre-existing cryptocurrency in which some quantity of tradeable units of the pre-existing cryptocurrency is associated with the resource or the resource provider.

In some embodiments the consumer record is digitally signed by a private key shared by the consumer and an authentication server such that access to the resource by the consumer can be revoked by the authentication server transferring the quantity of cryptocurrency from the consumer record.

In some embodiments the consumer record is further digitally signed by a private key of the authentication server such that a transaction to transfer a value of cryptocurrency from the consumer record requires digital signature of both the shared private key and the private key of the authentication server.

The present disclosure accordingly provides, in a second aspect, a computer system for access control for a restricted resource of a resource provider in a network connected computer system comprising a processor and a data store, wherein a blockchain data structure accessible via the network stores digitally signed records validated by network connected miner software components, and wherein the processor is adapted to undertake the following: identifying an access control role definition for access to the resource, the role including a specification of access permissions; defining a cryptocurrency for indicating authorization to access the resource, the cryptocurrency being formed of tradeable units of value associated with records in the blockchain and wherein transfer of the cryptocurrency between records in the blockchain is validated by the miners; receiving a request from an authenticated resource consumer for authorization to access the resource; and submitting a blockchain transaction to the miner components to transfer a quantity of cryptocurrency to a consumer record in the blockchain, the transaction including an identification of the role, such that the consumer record identifies that the consumer is authorized to access the resource in accordance with the role definition.

The present disclosure accordingly provides, in a third aspect, a computer program element comprising computer program code to, when loaded into a computer system and executed thereon, cause the computer to perform the method as described above.

BRIEF DESCRIPTION OF THE DRAWINGS

An embodiment of the present disclosure will now be described, by way of example only, with reference to the accompanying drawings, in which.

DETAILED DESCRIPTION

Figure 1:
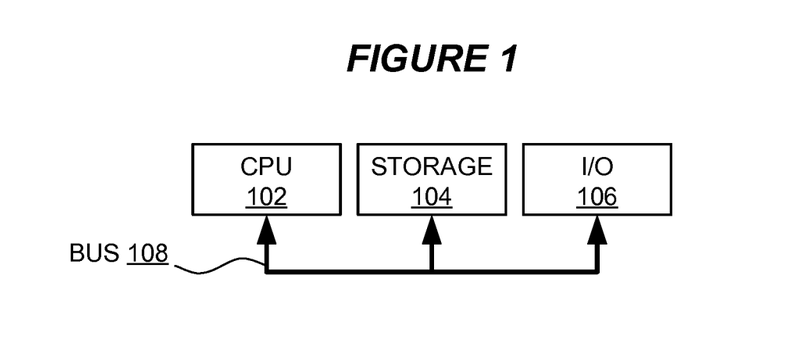
FIG. 1 is a block diagram of a computer system suitable for the operation of embodiments of the present disclosure.

FIG. 1 is a block diagram of a computer system suitable for the operation of components in embodiments of the present disclosure. A central processor unit (CPU) 102 is communicatively connected to storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
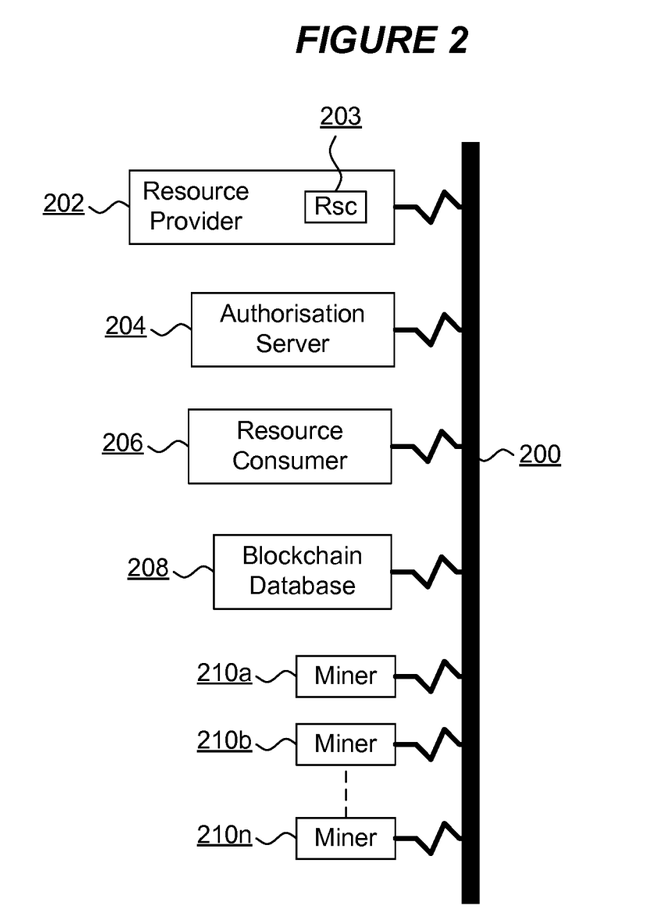
FIG. 2 is a component diagram of a network connected computer system arrangement in accordance with embodiments of the present disclosure.

FIG. 2 is a component diagram of a network connected computer system arrangement in accordance with embodiments of the present disclosure. A network 200 is provided as a wired or wireless physical or virtual communication medium for communicatively connecting computing components such as computer systems, data storage systems, physical or virtualized components such as software stacks and the like. The network 200 is depicted as a single continuous entity though it will be appreciated that the network 200 could have any communications network topology and/or arrangement. In some embodiments the network 200 is a series of communicatively connected networks or a logical arrangement of networks or subnetworks operating over potentially numerous underlying physical networks. In some embodiments the network 200 is the internet.

In communication with the network is provided a blockchain database 208 as a sequential transactional database or data structure that may be distributed and is communicatively connected to a network 200. The blockchain database 208 is a sequential transactional database that may be distributed. Sequential transactional databases are well known in the field of cryptocurrencies and are documented, for example, in "Mastering Bitcoin. Unlocking Digital Crypto-Currencies." (Andreas M. Antonopoulos, O'Reilly Media, April 2014). For convenience, the database is herein referred to as blockchain 208 though other suitable databases, data structures or mechanisms possessing the characteristics of a sequential transactional database can be treated similarly. The blockchain 208 provides a distributed chain of block data structures accessed by a network of nodes known as a network of miner software components or miners 210. Each block in the blockchain 208 includes one or more record data structures associated with entities interacting with the blockchain 208. Such entities can include software components or clients for which data is stored in the blockchain 208. The association between a record in the blockchain 208 and its corresponding entity is validated by a digital signature based on a public/private key pair of the entity. In one embodiment the blockchain 208 is a BitCoin blockchain and the blockchain 208 includes a Merkle tree of hash or digest values for transactions included in each block to arrive at a hash value for the block, which is itself combined with a hash value for a preceding block to generate a chain of blocks (i.e. a blockchain). A new block of transactions is added to the blockchain 208 by miner components 210 in the miner network. Typically, miner components are software components though conceivably miner components could be implemented in hardware, firmware or a combination of software, hardware and/or firmware. Miners 210 are communicatively connected to sources of transactions and access or copy the blockchain 208. A miner 210 undertakes validation of a substantive content of a transaction (such as criteria and/or executable code included therein) and adds a block of new transactions to the blockchain 208. In one embodiment, miners 210 add blocks to the blockchain 208 when a challenge is satisfied—known as a proof-of-work—such as a challenge involving a combination hash or digest for a prospective new block and a preceding block in the blockchain 208 and some challenge criterion. Thus miners 210 in the miner network may each generate prospective new blocks for addition to the blockchain 208. Where a miner satisfies or solves the challenge and validates the transactions in a prospective new block such new block is added to the blockchain 208. Accordingly the blockchain 208 provides a distributed mechanism for reliably verifying a data entity such as an entity constituting or representing the potential to consume a resource.

While the detailed operation of blockchains and the function of miners 210 in the miner network is beyond the scope of this specification, the manner in which the blockchain 208 and network of miners 210 operate is intended to ensure that only valid transactions are added within blocks to the blockchain 208 in a manner that is persistent within the blockchain 208. Transactions added erroneously or maliciously should not be verifiable by other miners 210 in the network and should not persist in the blockchain 208. This attribute of blockchains 208 is exploited by applications of blockchains 208 and miner networks such as cryptocurrency systems in which currency amounts are expendable in a reliable, auditable, verifiable way without repudiation and transactions involving currency amounts can take place between unrelated and/or untrusted entities. For example, blockchains 208 are employed to provide certainty that a value of cryptocurrency is spent only once and double spending does not occur (that is, spending the same cryptocurrency twice).

The arrangement of FIG. 2 further includes a network connected resource provider 202 component as a software, hardware, firmware or combination component having associated a computing resource 203 (such as a resource of the type hereinbefore described) for provision to consuming entities in the system such as the resource consumer 206. The resource consumer 206 is a network connected software, hardware, firmware or combination component that seeks to consume the resource 203 provided by the resource provider 202. The resource consumer 202 has associated a record in the blockchain 208.

Access to the resource 203 by the consumer 206 is controlled based on an access control mechanism partly implemented by an authorization server 204. The authorization server 204 is a software, hardware, firmware or combination component adapted to grant, preclude and/or revoke access to the resource 203.

For example, in one embodiment the resource provider 202 is a cloud computing service provider providing a resource 203 as a cloud computing service such as a data storage service. In such an exemplary embodiment the authorization server 204 is a component of an organization having multiple resource consumers including consumer 206, such as an employer organization having multiple employees. In an alternative exemplary embodiment the resource 203 is a media resource and the authorization server 204 is a network connected authorization service for providing access to the resource 203 by client computer systems such as web browsers as consumers 206 distributed over the network 200.

In summary, in use, the authorization server 204 communicates with the resource provider 202 to identify an access control role definition for access to the resource 203. A role definition is a definition of access control permissions for a particular consumer 203 or class or type of consumer 203 and permissions can define access rights and/or capabilities that are grantable to such consumer(s) depending on the particular nature of the resource 203. For example, a data storage resource can have role permissions defining access to read, write, delete and create data. In a further example, a network communication resource can have role permissions defining access to send and receive data via the network. The role definition is stored by the resource provider 202 and the authorization server 204.

A new or derived cryptocurrency is defined as a quantity of tradeable units of value and recorded in the blockchain 208. In some embodiments the quantity of cryptocurrency is recorded in association with the authorization server 204 such as by association with a record for the authorization server 204 in the blockchain 208. Such a record can be a blockchain account or contract. In some embodiments the cryptocurrency is a bespoke cryptocurrency generated specifically for the purposes of access control, such new cryptocurrency being associated with the resource 203, a set of resources, the resource provider 202 and/or the authorization server 204. Alternatively the cryptocurrency is an existing cryptocurrency for which some quantity of cryptocurrency is adapted for specific association with the resource 203, a set of resources, the resource provider 202 and/or the authorization server 204.

For example, one blockchain-based environment suitable for the implementation of embodiments of the present invention is the Ethereum environment. The paper "Ethereum: A Secure Decentralised Generalised Transaction Ledger" (Wood, Ethereum, 2014) (hereinafter "Ethereum") provides a formal definition of a generalized transaction-based state machine using a blockchain as a decentralized value-transfer system. In an Ethereum embodiment the cryptocurrency is defined as a new unit of tradeable value by an Ethereum account having executable code for handling expenditure of the currency.

In an alternative embodiment, blockchain 208 is a BitCoin blockchain and a derivative of BitCoin cryptocurrency is employed, such as by marking units of BitCoin for association to the resource 203, a set of resources, the resource provider 202 and/or the authorization server 204. For example, Colored Coins can be used to create a dedicated cryptocurrency that can be validated by the miners 210 (see, for example, "Overview of Colored Coins" (Meni Rosenfeld, Dec. 4, 2012) and "Colored Coins Whitepaper" (Assia, Y. et al, 2015) and available at docs.google.com In one embodiment the cryptocurrency is defined by the authorization server 204 and identified to the resource provider 202. In an alternative embodiment the cryptocurrency is defined by the resource provider 202 and some quantity of the cryptocurrency is provided to the authorization server 204 by way of a blockchain transaction to transfer cryptocurrency to the blockchain record associated with the authorization server 204.

In use the consumer 206 authenticates with the authorization server 204 using any suitable authentication method as well known to those skilled in the art (e.g. shared secret, biometric, etc.). Once authenticated the authorization server 204 determines which access control role, if any, the consumer 206 should have. The authorization server 204 effects authorization of the consumer 206 by generating a new transaction for the blockchain 208 to transfer a quantity of cryptocurrency from the blockchain record for the authorization server 204 to a blockchain record for the consumer 206. The consumer 206 may not have a pre-existing blockchain record such as a blockchain account or contract for the access control cryptocurrency and, in such cases, a transaction is generated by the authorization server 204 for submission to the blockchain 208 to generate a new record for the consumer 206. The transaction for transferring cryptocurrency to the consumer record includes an identification of the role. The consumer record is adapted to store the role identification. The transaction(s) generated by the authorization server 204 are received by the miners 210 who seek to validate the transactions (including checking the validity of the ownership of cryptocurrency by the authorization server 204 as a basis for the transfer to the consumer record) before being committed to the blockchain 208.

The transfer of cryptocurrency to the consumer record in the blockchain 208 constitutes an authorization of the consumer 206 to access the resource 203 according to the role stored in the consumer record. Accordingly this authorization can be confirmed by reference to the blockchain 208. Notably, the blockchain 208 can be implemented as a public data structure on the network 200 and accordingly the authorization for access to the resource 203 is readily identified by any entity communicatively connected to the network from any network connected location. Subsequently the resource provider 202 uses the confirmed ownership of a quantity of the cryptocurrency by the consumer 206 as indicated in the blockchain 208 to grant access to the resource 203 by the consumer 206. The inclusion of the role identification in the consumer record also provides for the application of appropriate access permissions by the resource provider 202. Embodiments of the present disclosure therefore provide for consistent and distributed access to verifiable access control information for network connected entities accessing the blockchain 208. Further, trust between the consumer 206 and resource provider 202 is not required. The resource provider 202 need only be aware of the cryptocurrency and role definition and is abstracted from any complexity surrounding individual consumer access control permissions or roles. The authorization server 204 is able to implement an access control mechanism for consumers 206 even before the consumers are known.

Figure 3:
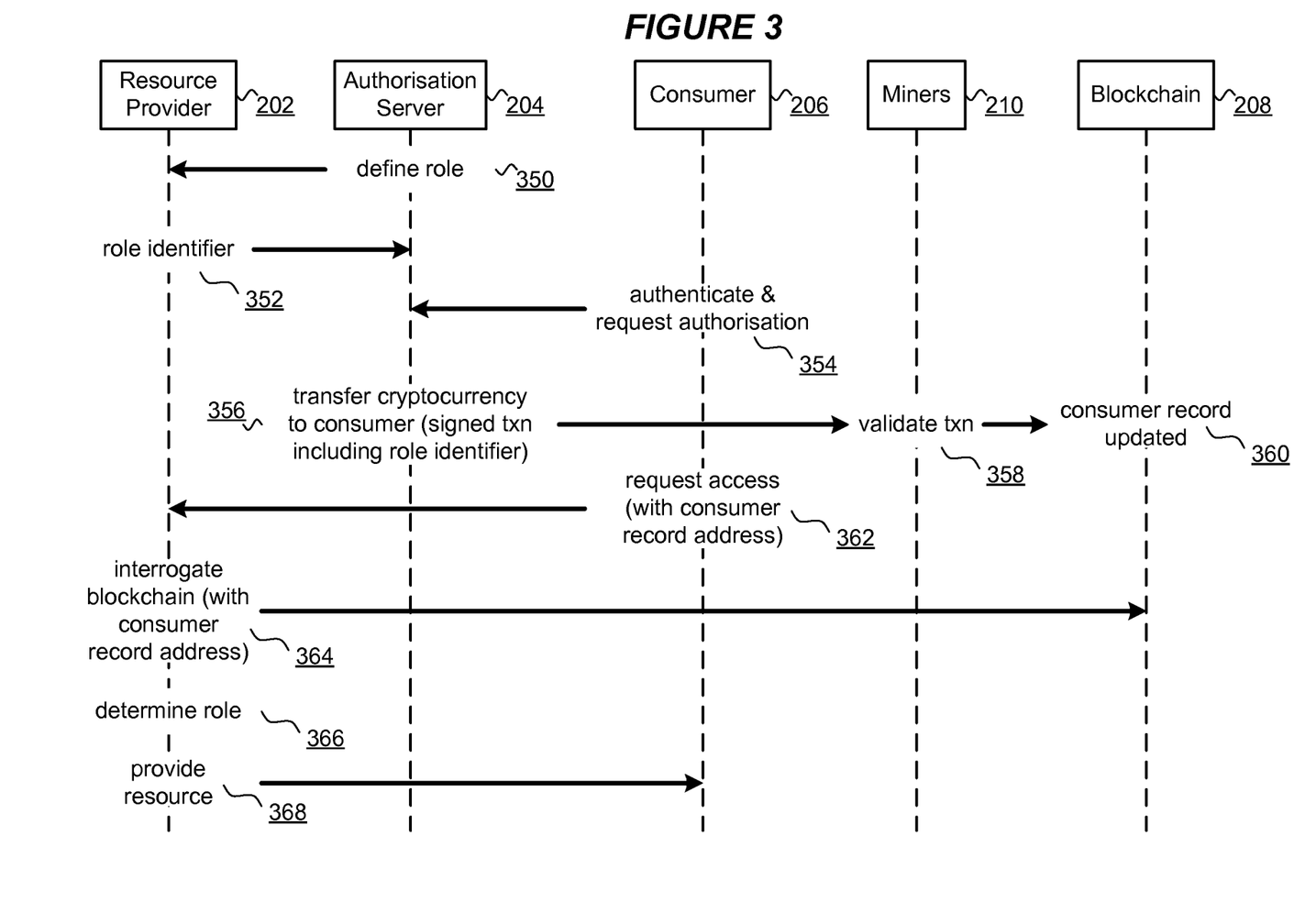
FIG. 3 is a flow diagram illustrating a method of access control for a restricted resource of a resource provider in a network connected computer system in accordance with embodiments of the present disclosure.

FIG. 3 is a flow diagram illustrating a method of access control for a restricted resource 203 of a resource provider 202 in a network connected computer system in accordance with embodiments of the present disclosure. Initially at 350 a role is defined by or using the authorization server 204 including a definition of access control permissions for a class, type or category of consumer. The role definition is stored by the resource provider 202. In an alternative embodiment the role is defined by or using the resource provider 202 directly. At 352 an identification of the role is received by the authorization server 204. Subsequently, at 354, the consumer 206 authenticates with the authorization server 204 and requests authorization to access the resource 203. The authorization server generates a transaction for the blockchain 208 at 356 for transferring a quantity of cryptocurrency to the consumer record in the blockchain 208. The transaction includes an identification of the role and is signed by the authorization server 204. In one embodiment the consumer record does not exist and an additional transaction is generated by the authorization server 204 to generate the consumer record for association with the consumer 206. The transaction(s) is/are received by miners 210 and validated at 358 for inclusion in a new block for addition to the blockchain at 360. Thus the transaction results in the transfer of cryptocurrency to the consumer record in the blockchain 208, the consumer record including an identification of the role.

In one embodiment the identification of the role in the blockchain is obfuscated such that the role of the consumer 206 or the resource or resource provider accessed by the consumer 206 is not discernible from the blockchain. For example, the role identifier can be encrypted by the resource provider or a convention or rule can be defined between the resource provider 202 and the authorization server 204 defining how the role identifier will be obfuscated, codified or stored in a manner that it cannot be interpreted or understood by other entities.

Subsequently, at 362, the consumer 206 requests that the resource provider 202 grant the consumer 206 access to the resource 203. The request includes an identification of the consumer record in the blockchain 208 such as an address of an account or contract in the blockchain 208. At 364 the resource provider 202 interrogates the blockchain 208 based on the consumer address to determine whether the consumer is in possession of the requisite cryptocurrency for the resource 203. Notably, the cryptocurrency can be resource specific or resource provider specific. Further, the cryptocurrency could be specific to the authorization server. In any event the cryptocurrency is defined such that the resource provider 202 can determine that possession of a quantity of the cryptocurrency sufficiently validates access to the resource. Where the resource provider 202 confirms that the consumer 206 is in possession of the required cryptocurrency the resource provider 202 accesses the role identification in the consumer record on the blockchain 208. Any obfuscation of the role identification is processed by the resource provider 202 (such as decryption, decoding or interpreting the representation of the role identifier) in order to determine the appropriate role at step 366. Finally, at step 368 the resource provider 202 grants access to the resource 203 in accordance with the permissions defined in the role identifier.

The transfer of cryptocurrency to the consumer record in the blockchain 208 by the authorization server 204 thus constitutes the granting of access to the resource 203. Revocation or modification of such access can be achieved in a number of ways. Modification can be achieved by modification of the role definition or revocation of an existing authorization and issuance of a new authorization (such as a new cryptocurrency).

In one embodiment access can be revoked by rendering the cryptocurrency invalid for access to the resource 203. This approach will affect all consumers authorized by the authorization server 204 using the same cryptocurrency. Where revocation is required on a consumer level granularity, a forced expenditure of the quantity of cryptocurrency in the customer record can be undertaken. Thus a new blockchain transaction can be generated that transfers the quantity of cryptocurrency owned by the consumer 206 to another blockchain record, such as a record associated with the authorization server 204 or the resource provider 202. Expending cryptocurrency requires that a transaction is digitally signed by the owner of the currency and accordingly a total expenditure transaction would need to be signed by the consumer 206 (as owner of the consumer record). Thus, in such embodiments, it is necessary for the authorization server 204 to have access to the private key for the consumer 206. In an alternative embodiment the consumer record 206 is not generated and signed with the private key of the consumer 206 but is alternatively signed by a new private key generated by the authorization server 204 specifically for the access control cryptocurrency transaction. The new private key can be shared securely between the authorization server 204 and the consumer 206 and thus expenditure of the cryptocurrency can be achieved by both the authorization server 204 and the consumer 206, such as to effect revocation of authorization to access the resource 203.

One challenge when permitting the consumer 206 to perform transactions in respect of the consumer record is that the consumer 206 could conceivably transfer all or part of the access control cryptocurrency to a third party—such as a third party not authorized by the authorization server 204. To mitigate this problem a multisignature approach can be adopted such that the consumer record is signed twice—once by the private key shared by the authorization server 204 and the consumer 206 and once by the private key that is secret to the authorization server 204. Using such a multisignature approach there can be no valid transactions for transfer of the cryptocurrency owned by the consumer 206 without being signed by both the shared private key and the authorization server's 204 private key.

It can be beneficial for the resource provider 202 to adapt access control to the resource 203 depending on context and circumstances. For example, where the resource 203 is in high demand and there is contention for access to the resource 203 or the resource 203 is heavily utilized affecting, for example, performance or accessibility of the resource, it can be beneficial to throttle, control, constrain or restrict access to the resource 203. Such changes to access to the resource 203 can also be desirable depending on a state of operation of the resource provider 202 itself, such as when the provider 202 is experiencing high utilization or workload, particular operating conditions such as temperature, malfunction, update, repair, infection with malware and the like. Furthermore, it can be desirable for the resource provider 202 to restrict an extent to which the authorization server 204 is able to grant access to the resource 203. An alternative arrangement according to some embodiments of the present invention providing these additional facilities is described below with respect FIG. 4.

Figure 4:
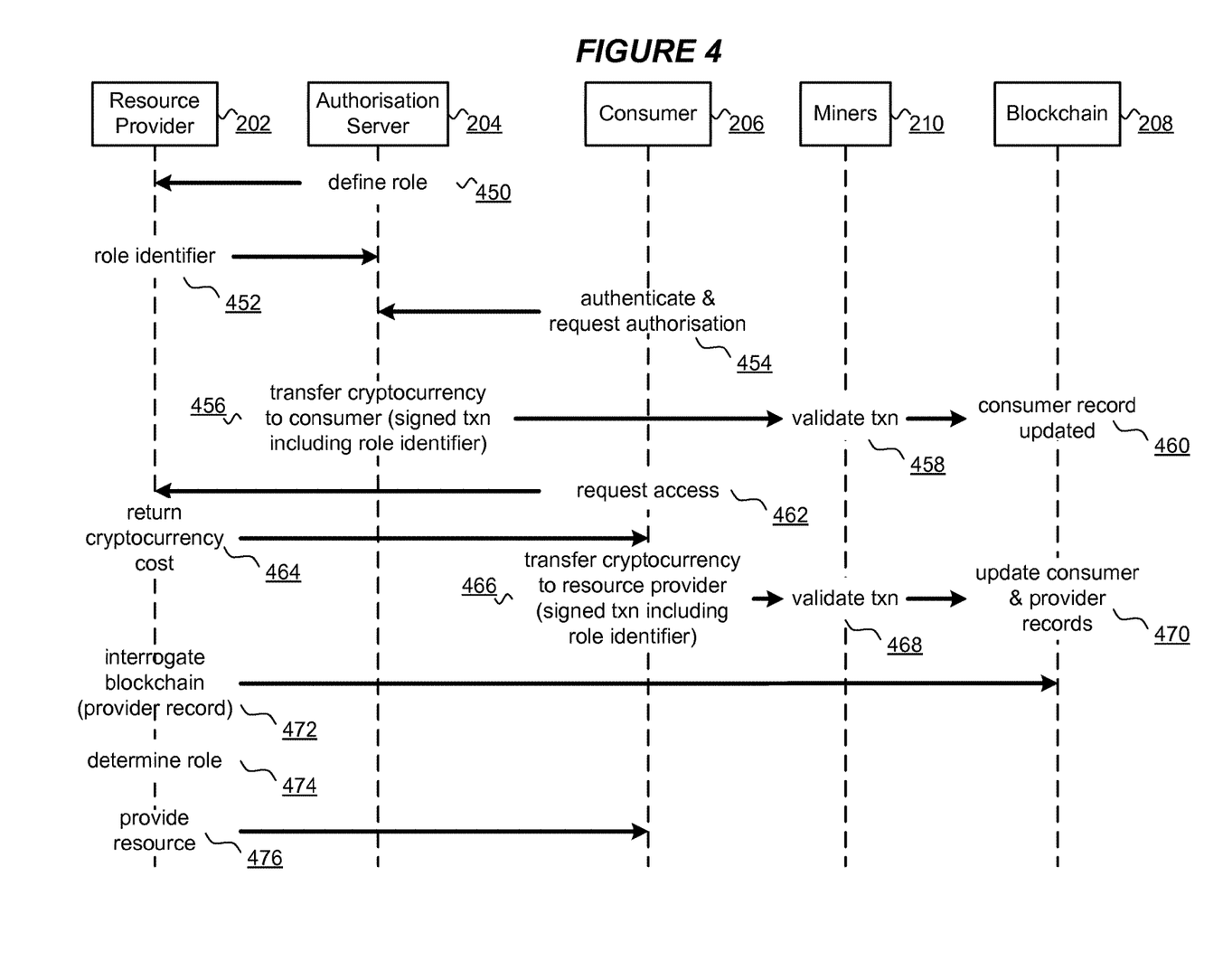
FIG. 4 is a flow diagram illustrating a method of access control for a restricted resource of a resource provider in a network connected computer system in accordance with alternative embodiments of the present disclosure.

FIG. 4 is a flow diagram illustrating a method of access control for a restricted resource of a resource provider in a network connected computer system in accordance with alternative embodiments of the present disclosure. In FIG. 4, 450 to 460 are identical to 350 to 360 of FIG. 3 and these will not be repeated here. The arrangement of FIG. 4 differs from that of FIG. 3 in that access to the resource 203 is provided depending not only on possession by the consumer 206 of a quantity of cryptocurrency but also on the particular quantity of cryptocurrency possessed by the consumer 206. Thus at 462 the consumer 206 requests access to the resource 203 by the resource provider 202. The resource provider 202 responds at 464 with a quantity of cryptocurrency required to access the resource 203. In one embodiment the request at 462 is supplemented by parameters such as an extent, time period, amount or other measure of usage of the resource 203. Further, in some embodiments the quantity of cryptocurrency indicated by the resource provider at 202 can be determined based on factors such as operating factors, situational factors, resource consumption, extent of consumption or other factors. Subsequently, at 466 the consumer 206 generates a blockchain transaction to transfer a quantity of cryptocurrency to the resource provider 202, such as by transferring cryptocurrency to a blockchain record for the resource provider 202. The transaction involves expenditure of cryptocurrency possessed by the consumer 206 in the consumer record in the blockchain 208 and accordingly the transfer also includes the role identifier stored in the consumer record. The transaction by the consumer 206 is signed by the consumer 206. In embodiments where a shared private key is used to sign the consumer record (shared by the consumer 206 and the authorization server 204) then the transaction is signed using the shared key. Further, in transactions where multiple signatures are used to sign the consumer record then the multiple signatures are used to sign the transaction (notably this may involve the consumer 206 communicating with the authentication server 204 to have the transaction signed by the authentication server 204). The transaction is submitted to the miners 210 for validation at 468 and entry on the blockchain 208 resulting in an update to the consumer record and the provider record at 470. Subsequently the resource provider 202 can interrogate the blockchain 208 to determine, check or identify that a cryptocurrency transaction has taken place and that a requisite amount of the required cryptocurrency has been received by the provider 202 in the provider record. When this is confirmed the provider 202 determines 474 the role for the consumer 206 based on the role identification from the transaction and provides 476 the resource to the consumer in accordance with the role permissions.

One particularly advantageous application of the methodology of FIG. 4 is when the resource provider 202 or resource 203 enters a critical situation or condition, such as an acute shortage or emergency situation. In such situations a quantity of cryptocurrency required for consumption of the resource can be elevated by one or more orders of magnitude such that a majority of consumers will have insufficient cryptocurrency to consume the resource 203. In parallel to this inflation of the cryptocurrency requirement a new quantity of cryptocurrency can be transferred—of an appropriate order of magnitude to permit consumption of the resource 203—to a specific authorization server for dissemination between particular consumers for which access to the critical resource is essential.

For example, in an emergency situation where access to a communication network is essential, access to the network can be restricted to only critical consumers (such as emergency services or the like) by elevating the cryptocurrency cost beyond the reach of non-critical consumers and disseminating quantities of cryptocurrency to critical consumers.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method of access control for a restricted resource of a resource provider in a network connected computer system, wherein a blockchain data structure accessible via the network stores digitally signed records validated by network connected miner software components, the method comprising:

identifying an access control role definition for access to the restricted resource, the access control role definition including a specification of access permissions for a class of access based on a role, wherein the access permissions for a particular class of access are the same for a first consumer having a particular role and a second consumer having the particular role;

defining a cryptocurrency for indicating authorization to access the restricted resource, the cryptocurrency being formed of tradeable units of value associated with records in the blockchain and wherein transfer of the cryptocurrency between records in the blockchain is validated by the miner software components;

receiving a request from an authenticated resource consumer for authorization to access the restricted resource, wherein the consumer record is digitally signed by a private key shared by the authenticated resource consumer and an authentication server such that access to the restricted resource by the authenticated resource consumer can be revoked by the authentication server transferring the quantity of cryptocurrency from the consumer record; and submitting a blockchain transaction to the miner software components to transfer a quantity of cryptocurrency to a consumer record in the blockchain, the blockchain transaction including an identification of the access control role definition, such that the consumer record identifies that the authenticated resource consumer is authorized to access the restricted resource in accordance with the access control role definition.

2. The method of claim 1, wherein the identification of the access control role definition in the consumer record is obfuscated such that the identification is not discernible without a shared secret.

3. The method of claim 1, wherein the cryptocurrency is a pre-existing cryptocurrency in which some quantity of tradeable units of the pre-existing cryptocurrency is associated with the restricted resource or the resource provider.

4. The method of claim 1, wherein the consumer record is further digitally signed by a private key of the authentication server such that a transaction to transfer a value of cryptocurrency from the consumer record requires digital signature of both the shared private key and the private key of the authentication server.

5. A computer system for access control for a restricted resource of a resource provider in a network connected computer system, wherein a blockchain data structure accessible via the network stores digitally signed records validated by network connected miner software components, the system comprising:

a processor and a data store, wherein the processor is adapted to:

identify an access control role definition for access to the restricted resource, the access control role definition including a specification of access permissions for a class of access based on a role, wherein the access permissions for a particular class of access are the same for a first consumer having a particular role and a second consumer having the particular role;

define a cryptocurrency for indicating authorization to access the restricted resource, the cryptocurrency being formed of tradeable units of value associated with records in the blockchain and wherein transfer of the cryptocurrency between records in the blockchain is validated by the miner software components;

receive a request from an authenticated resource consumer for authorization to access the restricted resource, wherein the consumer record is digitally signed by a private key shared by the authenticated resource consumer and an authentication server such that access to the restricted resource by the authenticated resource consumer can be revoked by the authentication server transferring the quantity of cryptocurrency from the consumer record; and submit a blockchain transaction to the miner software components to transfer a quantity of cryptocurrency to a consumer record in the blockchain, the blockchain transaction including an identification of the access control role definition, such that the consumer record identifies that the authenticated resource consumer is authorized to access the restricted resource in accordance with the access control role definition.

6. A non-transitory computer-readable storage medium storing a computer program element comprising computer program code to, when loaded into a computer system and executed thereon, cause the computer to perform access control for a restricted resource of a resource provider in a network connected computer system, wherein a blockchain data structure accessible via the network stores digitally signed records validated by network connected miner software components, including:

identifying an access control role definition for access to the restricted resource, the access control role definition including a specification of access permissions for a class of access based on a role, wherein the access permissions for a particular class of access are the same for a first consumer having a particular role and a second consumer having the particular role;

defining a cryptocurrency for indicating authorization to access the restricted resource, the cryptocurrency being formed of tradeable units of value associated with records in the blockchain and wherein transfer of the cryptocurrency between records in the blockchain is validated by the miner software components;

receiving a request from an authenticated resource consumer for authorization to access the restricted resource, wherein the consumer record is digitally signed by a private key shared by the authenticated resource consumer and an authentication server such that access to the restricted resource by the authenticated resource consumer can be revoked by the authentication server transferring the quantity of cryptocurrency from the consumer record; and submitting a blockchain transaction to the miner software components to transfer a quantity of cryptocurrency to a consumer record in the blockchain, the blockchain transaction including an identification of the access control role definition, such that the consumer record identifies that the authenticated resource consumer is authorized to access the restricted resource in accordance with the access control role definition.

* * * * *